A. ORZECHOWSKI.
NUT LOCK.
APPLICATION FILED JAN. 15, 1913.
1,077,940.
Patented Nov. 4, 1913.
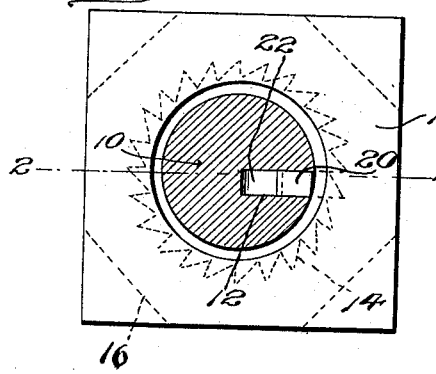
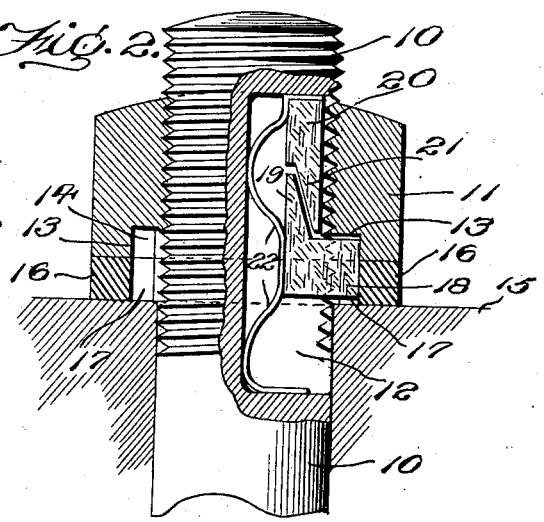
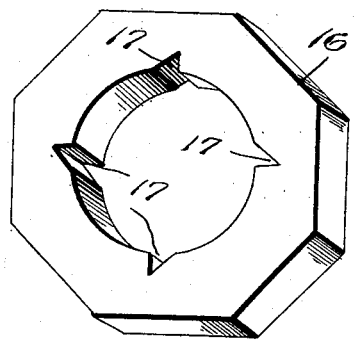
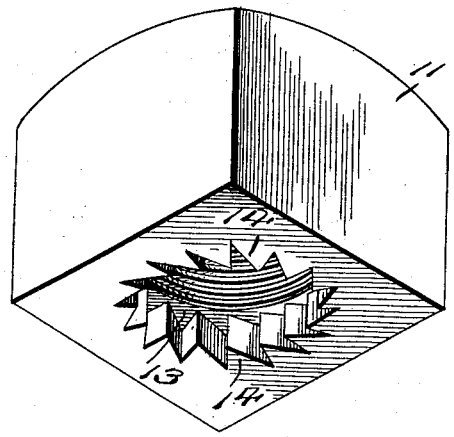
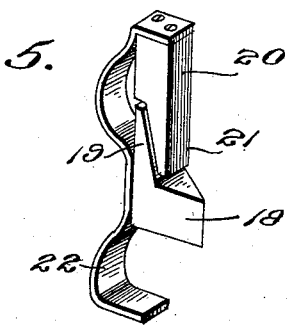
Inventor
Antoni Orzechowski.

UNITED STATES PATENT OFFICE.

ANTONI ORZECHOWSKI, OF STAMFORD, CONNECTICUT.

NUT-LOCK.

1,077,940.

Specification of Letters Patent.   Patented Nov. 4, 1913.

Application filed January 15, 1913.   Serial No. 742,237.

*To all whom it may concern:*

Be it known that I, ANTONI ORZECHOWSKI, citizen of the United States, residing at Stamford, in the county of Fairfield and State of Connecticut, have invented certain new and useful Improvements in Nut-Locks, of which the following is a specification.

This invention relates to improvements in nut locks and has for one of its objects to simplify and improve the construction and increase the efficiency and utility of devices of this character.

Another object of the invention is to provide a simply constructed device which may be readily applied to bolts and nuts of various sizes and to bolts and nuts employed for various purposes.

Another object of the invention is to provide a simply constructed device whereby the nut may be readily released when it is to be removed, but will be firmly held from retrograde movement when the device is applied.

With these and other objects in view the invention consists in certain novel features of construction as hereafter shown and described, and then specifically pointed out in the claims, and in the drawings illustrative of the preferred embodiment of the invention.

Figure 1 is a plan view of the improved nut. Fig. 2 is a section on the line 2—2 of Fig. 1. Fig. 3 is a perspective view of the improved nut from beneath. Fig. 4 is a perspective view of the improved washer from above. Fig. 5 is a detached perspective view of the spring actuated holding pawl.

Corresponding and like parts are referred to in the following description and indicated in all the views of the accompanying drawing by the same reference characters.

The bolt employed in connection with the improved device is represented conventionally at 10 and the nut at 11. The bolt is provided with a recess 12 extending longitudinally within the threaded portion and transversely of the threads, as shown. The nut 11 is provided with an annular recess 13 in its inner face and surrounding the threaded aperture and with ratchet teeth 14 in the walls of the annular recess. Bearing upon the inner face of the nut 11, and between the nut and the structure through which the bolt passes, is a washer 16 having an aperture slightly larger than the outer circumference of the threaded portion of the bolt and provided with one or more radial recesses 17 corresponding to and adapted to register with one of the teeth of the nut-recess. One of the apertures 17 only is required to enable the washer to be employed, but to avoid the necessity for rotating the washer to its full distance around the bolt, a plurality of the recesses are employed as shown in Fig. 4.

The nut 11 may be of any desired form either hexagonal or square, but for the purpose of illustration is shown square, and the washer 16 is shown eight-sided, four of the sides adapted to correspond with the side faces of the nut when the latter is in one position and the remaining four sides adapted to correspond with the sides of the nut when the washer is rotated one-eighth of a revolution. By this arrangement the location of the washer is facilitated. The recesses 17 are located midway of four of the sides of the washer, while the segmental portions of the aperture of the washer are located opposite the remaining flat faces of the washer, the object to be hereafter explained.

Fitting within the recess 12 of the bolt is a pawl device represented as a whole at 18 and extending into the toothed recess of the nut and likewise extending into one of the recesses 17 of the washer when the latter is located with the recess 17 registering with one of the teeth of the recess in the nut. The pawl 18 is provided with a projection 19 having one face inclined obliquely to the longitudinal plane of the bolt. Fitting within the recess 12 adjacent to the pawl 18 is a block 20 having a projection 21 which overlaps the projection 19 and is formed with one face correspondingly inclined or oblique thereto, as shown in Figs. 2 and 5. A spring 22 is connected to the pawl 18 and the block 20 and operates to maintain the pawl yieldably in engagement with the teeth of the recess 13. One face of each of the teeth 14 extends radially of the bolt opening of the nut 11 while the other face extends tangentially of the bolt opening, and thus lock the nut in position relative to the bolt 10.

When it is desired to remove the nut, a suitable implement is inserted to move the block 20 inwardly to release the pawl 18 to a sufficient extent to enable the main nut to be "backed" off slightly to loosen the binding effect of the nut. The washer 16 is then rotated a part of a revolution to cause the nearest segmental portion of the interior of the washer to pass over the pawl and force the latter normally out of engagement with the teeth in the recess of the nut, and thus releasing the latter which may be turned backwardly from the bolt, and without injury to any of the parts. Thus the nut can be used repeatedly, as no part is injured or destroyed during its operation.

The recess 12 extends at its upper end above the upper face of the nut 11 so that a suitable implement may be inserted to force the block 20 inwardly and cause its projection 21 to engage the corresponding projection 19 of the pawl 18 and move the latter inwardly therewith and release it from the ratchet teeth.

The improved device is simple in construction, can be inexpensively manufactured and applied to bolts and nuts of various sizes and forms.

Having thus described the invention what is claimed as new is:—

1. In a lock-nut, a bolt having a longitudinal recess in its threaded portion, a nut engaging the threaded portion of the bolt and provided with an annular toothed recess in one face, a spring actuated pawl operating in said longitudinal bolt recess and engaging the teeth of the nut recess and extending beyond the recessed face of the nut, and a releasing washer bearing against the recessed face of the nut and with a radial recess registering when in one position with one of the teeth of the nut recess to receive the pawl when the same is engaged with the said spaces between two of the teeth.

2. In a lock-nut, a bolt having a longitudinal recess in its threaded portion, a nut engaging the threaded portion of the bolt and provided with an annular toothed recess in one face, a spring within said bolt-recess, a pawl engaged by said spring and engaging the teeth of the said nut recess one at a time, and a block engaged by said spring and overlapping said pawl and adapted to release the same from the teeth of the recess when forced inwardly.

3. In a lock-nut, a bolt having a longitudinal recess in its threaded portion, a nut engaging the threaded portion of the bolt and provided with an annular toothed recess in one face, a spring within said bolt-recess, a pawl connected to said spring and engaging the teeth of the said nut-recess one at a time and formed with a projection at one end with the outer face of the projection inclined to the longitudinal plane of the pawl, and a block connected to said spring and engaging in said bolt-recess and provided with a projection having one inclined face corresponding to and overlapping the inclined face of the pawl projection.

4. In a lock-nut, a bolt having a longitudinal recess in its threaded portion, a nut engaging the threaded portion of the bolt and provided with an annular toothed recess in one face, a spring within said bolt-recess, a pawl connected to said spring and engaging in said nut-recess, and a releasing washer bearing against the recessed face of the nut and with a radial recess registering when in one position with one of the teeth of the nut-recess to receive the pawl when the same is engaged with said spaces between two of the teeth.

In testimony whereof I affix my signature in presence of two witnesses.

ANTONI ORZECHOWSKI. [L. S.]

Witnesses:
 W. MYRON WEED,
 E. N. FAST.

Copies of this patent may be obtained for five cents each, by addressing the "Commissioner of Patents, Washington, D. C."